Jan. 14, 1936.  W. C. STARKEY  2,027,794

SPRING CLUTCH

Filed June 17, 1932

Inventor:
William C. Starkey,
By: Arthur Wm Nelson
Att'y.

Patented Jan. 14, 1936

2,027,794

UNITED STATES PATENT OFFICE 2,027,794

SPRING CLUTCH

William C. Starkey, Indianapolis, Ind., assignor, by mesne assignments, to William C. Starkey, Raymond S. Pruitt, and Walter H. Beal, trustees Application June 17, 1932, Serial No. 617,781

11 Claims. (Cl. 192—41)

This invention relates to spring clutches and more particularly to a single pocket spring clutch device designed especially for use as a free wheeling unit for automobiles.

The primary object of the invention is to provide an improved single pocket clutch of this kind embodying therein inner and outer clutch members coacting to provide an annular clutch spring recess, with one of said members defining a clutch surface and the other of said clutch members being formed with means for engaging one end of the spring so that when said clutch members rotate relatively to one another in one direction, the spring is caused to change its diameter in one direction and to grip said surface in such a manner as to clutch said members together for conjoint relation.

Other objects of the invention, together with the many advantages and characteristics of the present spring clutch device will more fully appear from a consideration of the following specification.

Referring to the drawing, wherein is illustrated the preferred embodiment of the invention—

Figure 1:
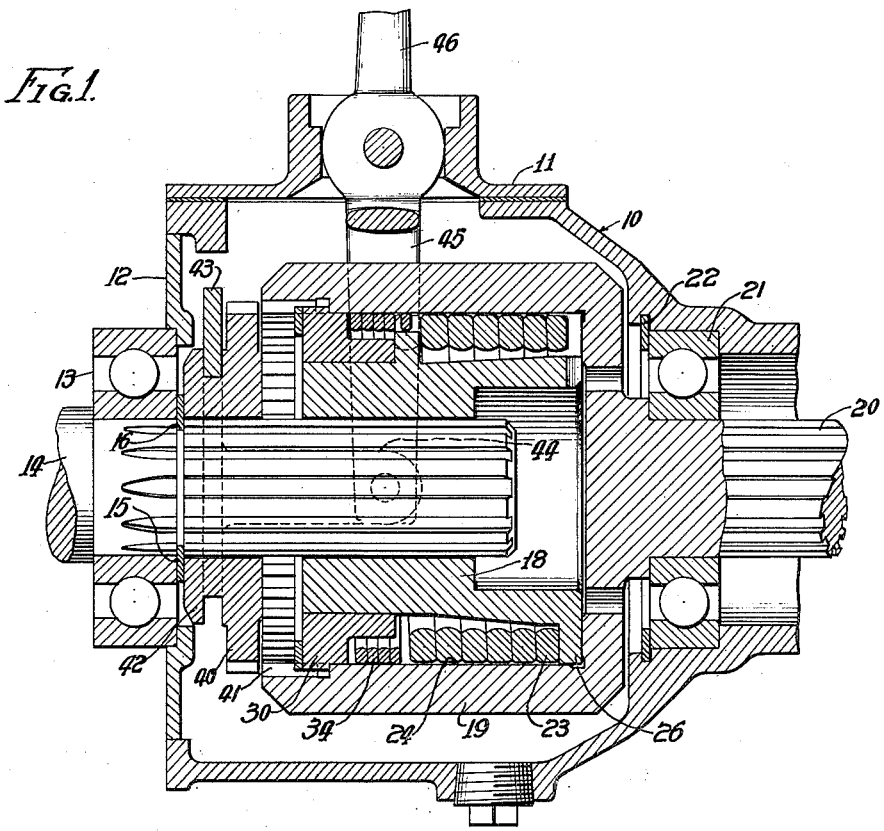
Figure 1 is a vertical longitudinal sectional view through a spring clutch embodying the invention as when incorporated in a free wheeling unit for an automobile.
Figure 3:
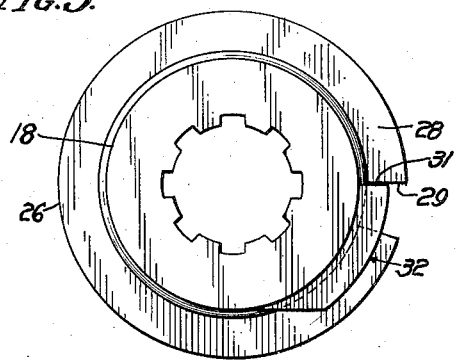
Figure 3 is an end elevation of the driving member shown in Figure 2.

Referring now more particularly to the drawing, 10 indicates a casing, within which the free wheeling unit is mounted and which is designed to be secured to the rear end of a conventional automobile change speed gear transmission (not shown). This casing has a top closure plate 11 and an end closure plate 12. Carried by the plate 12 and the rear wall of the transmission casing before mentioned is an antifriction bearing 13 for a driving shaft 14. Relative movement between the driving shaft 14 and the bearing 13 is prevented by means of a lock ring 15 which bears against the inner end face of the inner ball race of the bearing 13 and fits within an annular groove 16 in said drive shaft 14.

Splined to the end of said drive shaft is a driving member 18 which is in the form of a sleeve and is disposed within a cup-shaped clutch member 19 which constitutes the driven member of the clutch. The driven member is preferably formed as an integral part of a driven shaft 20 which is journalled in the rear end of the casing 10 by means of an anti-friction bearing 21. The latter is held in place within the casing by a snap ring 22.

Interposed between the driving and driven members 18 and 19, is a clutch spring 23 which is normally of slightly less diameter than that of the recess in the cup-shaped, driven member 19 but which is adapted to be expanded by relative rotation between the driven and driving members into engagement with a clutch surface or wall 24 provided in the driven member 19 to clutch the two members together. The driving member is provided at one end with an incomplete radial flange 26 having a flat outer face 27 and a helical inner face 28, the pitch of which is substantially equal to the pitch of the spring 23, the wider end of said flange forming an abutment 29.

The spring 23 which has a normal inside diameter greater than the sleeve-type driving member, 18 encompasses said member 18 and has its end adjacent the flange 26 in engagement with the abutment 29 and the side face of the first coil of the spring in engagement with the helical face 28 of the flange. The other end of the spring 23 abuts against the end face 31 of a radially projecting arcuate lug 32 which is spaced from the flange 26 in an axial direction. In order to assure a close fit between the lug 32 and the last coil of spring 23, the side face 33 of the lug is formed parallel to the helical face 28 of flange 26 and is spaced from the face 28 a distance substantially equal to the pitch of spring 23 multiplied by the number of turns in the spring which are desired or necessary for the proper functioning of the clutch and which in the present instance is illustrated as 6.

The outer diameter of the flange 26 is substantially equal to the diameter of the recess in the driven member to maintain the driving and driven members 18 and 19 in axial alignment. In order further to assure accurate axial alignment of the driving and driven members a bushing 30 preferably of bronze is interposed between said members near that end opposite the flange 26 of the driving member.

Figure 2:
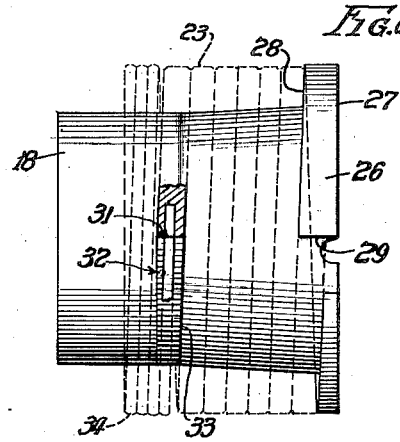
Figure 2 is a top plan view of the driving member of the clutch with the clutch spring shown in dotted lines to illustrate the relation between the same.

The lug 32 has a radial dimension less than that of the flange 26 in order to permit the first turn of an energizing spring 34 to lie between said lug and the wall 24 of the recess in the driven clutch member 19. The energizing spring 34 is normally of larger diameter than that of the clutch recess in member 19 and has its end adjacent the clutch spring 23 secured to the latter in any desired manner. In Fig. 2, the last mentioned end of the spring 23 is shown as provided with a recess into which the associated end of the energizing spring 34 extends and is securely fixed. When the clutch spring together with its energizing spring is placed within the recessed clutch member 19 the energizing spring must be contracted to a diameter less than the diameter of the recess. Upon release of the energizing spring after the same has been positioned within the cup-shaped driven member 19 the energizing spring will expand and exert a slight frictional drag against the wall 24.

During operation of the device, when the shaft 14 is rotated in a clockwise direction as viewed from the left hand end in Fig. 1, the driving clutch member 18 being splined thereto will also rotate in a clockwise direction and will carry with it the spring 23 because of the engagement of the end face 29 of flange 26 of the sleeve with the adjacent end of the spring 23. The spring 23 itself is free to turn within the cup-shaped driven member 19 since it is of less diameter than the recess but the turning of the energizing spring 34 is resisted by the member 19 through the frictional contact between wall 24 of the recess and the spring 34. This frictional resistance tends to unwind and expand the energizing spring and to set up a gripping action between the energizing spring and the wall 24 of the recess in clutch member 19 thereby increasing the frictional resistance. The force of this increased resistance is transmitted to the clutch spring 23 and causes the end thereof adjacent the energizing spring to expand and come into contact with the wall 24 of the recess in clutch member 19.

When once a portion of spring 23 has come into engagement with the wall 24 of the recess the friction between the two parts will cause the spring 23 to further unwind and expand until the entire outer surface of the spring is in frictional contact with the wall 24 at which time the driven clutch member 19 will be firmly gripped by the spring 23 so as to clutch the two clutch members together for conjoint rotation. If for any reason the driven member 19 tends to rotate faster than the driving clutch member 18, as for example, when the driving shaft is quickly decelerated or when the automobile on which the device is mounted is descending a grade, the driven clutch member 19 will cause the clutch spring 23 and its energizing spring 34 to be wound up and contracted, thereby disengaging the clutch spring 23 from the wall 24 and permitting the driven clutch member 19 to overrun the driving member 18.

When the clutch member 19 overruns the member 18, rotation of the spring 23 relatively to the member 18 is prevented by the engagement of the end of spring 23 adjacent the lug 32 against the end face 31 of the lug. Relative axial movement between the spring 23 and clutch member 18 is also prevented by the lug 32 by the engagement of the side face 33 against the side of the last turn of the spring 23, as shown in Fig. 1. Thus it will be seen that the lug 32 always acts to maintain the spring 23 in proper position and assures proper cooperation between the stop face 29 of clutch member 18 and the adjacent end of the spring when the driving member tends to rotate faster than the driven member.

It may sometime be desirable or necessary to prevent the driven shaft from overrunning the drive shaft as when the automobile on which the device is mounted is descending a steep grade and it is desired to use the engine of the vehicle as a brake. Means is therefore provided for locking the two clutch members 18 and 19 together and such means comprises a gear-like member 40 splined on drive shaft 14 between the bearing 13 and clutch member 18 to rotate with the latter. On the front end of the clutch member 19 are teeth 41 which are adapted to cooperate with the gear-like member 40 when the latter is shifted toward the right as viewed in Fig. 1. In order to shift the gear-like member 40 into and out of engagement with teeth 41 said member is provided with a grooved collar 42 which is engaged by a yoke 43, the latter having arms 44 to which are pivotally secured the arms of a shifter fork 45 pivoted in the top closure plate 11. The shifter fork has an upwardly extending operating lever 46 which may extend through the floorboard of the vehicle to a position for convenient manipulation by the operator of the vehicle, or said fork may be operated by a Bowden wire or similar device having a manipulating handle in a convenient position on the dash board of the automobile.

While the free wheeling unit in which the improved clutch is embodied, has been described as being positioned behind the conventional change speed transmission, it is to be understood that it may be located ahead of the transmission or in any other position between the motor and driven wheels of the automobile without departing from the spirit of the invention.

From the foregoing, it will be seen that a spring clutch device has been provided which is simple in construction and operation and economical of manufacture.

Although the foregoing description is necessarily of a detailed character in order completely to set forth the invention, it is to be understood that the specific terminology is not intended to be restrictive or confining and it is to be further understood that various rearrangements of parts and modifications of structural detail may be resorted to without departing from the scope or spirit of the invention.

I claim as my invention:—

1. In combination, relatively rotatable driving and driven members, the driven member being provided with a cylindrical recess and the driving member being disposed within said recess, a clutch spring arranged between said members and including a load carrying portion and an energizing portion, the latter portion normally having a slight frictional drag against the annular wall part of said recess, an abutment on the driving member against which an end of the load carrying portion of the spring is adapted to engage so that when the driving member is rotated in one direction it will operate through the energizing portion to unwind the load carrying portion of the spring and cause the same to expand and firmly grip said wall of the recess of the driven member and cause said two members to be clutched together, and means for preventing relative axial and rotative movement between the spring and driving member.

2. In combination, relatively rotatable driving and driven members, the driven member being provided with a cylindrical recess and the driving member being disposed within said recess, a clutch spring arranged between said members and including a load carrying portion and an energizing portion, the latter portion normally having a slight frictional drag against the annular wall of the recess, said load carrying portion having ends, and abutments on the driving member against which said ends of the load carrying portion of the spring are adapted to engage for maintaining the spring in proper position, said energizing portion when the driving member is rotated in one direction causing the load carrying portion of the spring to unwind and expand and firmly grip said wall of the recess of the driven member and clutch said two members together.

3. In a spring clutch device of the character described, the combination of a driven clutch member having a cylindrical recess therein with an annular wall defining said recess, a sleeve-like driving clutch member disposed in said recess and having an abutment projecting from the outer surface thereof, a clutch spring encompassing the driving clutch member and including a load carrying portion and an energizing portion of greater diameter than the load carrying portion consisting of a plurality of turns which normally have a slight frictional drag against the annular wall and are made of stock of smaller cross-sectional area than the turns of the load carrying portion so that they are more resilient than the turns of the latter, said load carrying portion having one end thereof engaged with the abutment so that when the driving member is rotated in one direction it operates through the energizing portion of the spring to unwind the load carrying portion and cause the same to expand and firmly grip said annular wall of the driven member to clutch said members together, and means applied to the other end of the load carrying portion of the spring for preventing axial displacement of the spring in one direction and holding said one end of the load carrying portion of the spring in engagement with the abutment.

4. In combination, a driven member having a cylindrical recess therein, a driving sleeve disposed within said recess and having abutments projecting from the outer surface thereof, and a clutch spring encompassing said sleeve and including a load carrying portion and an energizing portion, the latter portion normally having a slight frictional drag against the annular wall of the recess, the load carrying portion having ends, one of said abutments constituting means for engaging one end of the load carrying portion of the spring so that when the driving sleeve is rotated in one direction it will operate through the energizing portion to unwind the load carrying portion of the spring and cause the same to expand and firmly grip a wall of the recess of the driven member and clutch said two members together, the other of said abutments constituting means for preventing relative rotation between the load carrying portion of the spring and driving sleeve when the driven member overruns the driving member, and both of the abutments cooperating to prevent relative axial movement between the clutch spring as a whole and driving member.

5. In combination, a driven member having a cylindrical recess therein, a driving sleeve disposed within said recess and provided with an incomplete flange having its inner face helical shaped and provided with an abutment between the beginning and end of the helical face, a lug spaced from said flange and having a side face confronting and parallel to the helical face of said flange and an end face, a clutch spring encompassing said sleeve and including a load carrying portion and an energizing portion, the latter portion normally having a slight frictional drag with the annular wall of the recess, the load carrying portion having ends engaging respectively, with said abutment and the end face of said lug so that when the driving sleeve is rotated in one direction it will operate through the energizing portion to unwind the load carrying portion of the spring and cause it to expand and firmly grip said wall of the recess of the driven member and clutch said member and sleeve together, and when the driven member overruns said sleeve the end face of the lug will engage an end of the load carrying portion of the spring to prevent relative rotation between the clutch spring as a whole and said sleeve.

6. In a free wheeling unit, the combination of a driven member having a recess therein, a driving member disposed within said recess, a clutch spring loosely encompassing the driving member and interposed between the driving and driven members, said clutch spring including a load carrying portion and a more flexible energizing portion normally having a slight frictional drag with the annular wall of the recess and means carried by the driving member for preventing relative axial and rotative movement between the spring and the driving member, said means also functioning to engage an end of the load carrying portion of the spring during rotation of the driving member in one direction and operating through the energizing portion to unwind and expand the load carrying portion into firm gripping relation with said wall of the recess and clutch the driving and driven members together.

7. In a free wheeling unit, the combination of a driven member having a recess therein, a driving member disposed within said recess, means for maintaining the driving and driven members in accurate axial alignment, a clutch spring encompassing the driving member and interposed between the driving and driven members, said clutch spring including a load carrying portion and a more resilient energizing portion normally having a slight frictional drag with the annular wall of the recess and means carried by the driving member for preventing relative axial and rotative movement between the spring and the driving member, said last named means also functioning to engage an end of the spring during rotation of the driving member in one direction and operating through the energizing portion to unwind and expand the load carrying portion into firm gripping relation with said wall of the recess and clutch the driving and driven members together.

8. In a free wheeling unit, the combination of a driven member having a recess therein, a driving member disposed within said recess and having a flange near one end thereof provided with a shoulder, means for maintaining the driving and driven members in accurate axial alignment, and a clutch spring interposed between the driving and driven members and including a load carrying portion and an energizing portion normally having a slight frictional drag against the annular wall of the recess, the load carrying portion having an end for engagement with said shoulder so that when the driving member is rotated in one direction it will operate through the energizing portion to unwind the load carrying portion of the spring and cause the same to expand and firmly grip said wall of the recess in the driven member to clutch said members together and means for preventing relative axial and rotative movement between the spring as a whole and the driving member.

9. In a free wheeling unit, the combination of a driven member having a recess therein, a driving member disposed within said recess having a flange near one end thereof provided with a shoulder and a laterally extending lug spaced from the flange, and a clutch spring interposed between the driving and driven members and including a load carrying portion and an energizing portion having a slight frictional drag against the wall of the recess, the load carrying portion having ends engaged with the flange and lug on said driving member, the end of the spring adjacent the flange being disposed for engagement with the shoulder so that when the driving member is rotated in one direction it will operate through the energizing portion to unwind the load carrying portion of the spring and cause the same to expand and firmly grip said wall of the recess in the driven member to clutch said members together, and the end of the load carrying portion of the spring adjacent the lug being disposed for engagement with said lug to prevent relative rotative movement between the spring as a whole and the driving member.

10. In a clutch of the character described, the combination of a pair of relatively rotatable, complementary clutch members, arranged one within the other and shaped to form an annular recess therebetween, a clutch spring disposed in the recess between the two members and including a load carrying portion and an energizing portion connected to one end of the load carrying portion and normally having a slight frictional drag against one of the members, an abutment on the other member against which the other end of the load carrying portion of the spring is adapted to engage so that when said other member is rotated in one direction it will operate through the energizing portion of the spring to unwind the load carrying portion and cause the spring to change in diameter so as firmly to grip said one clutch member and cause the two members to be clutched together, and means applied to said one end of the load carrying portion of the spring for preventing axial displacement of the spring in one direction and holding said other end of the load carrying portion in engagement with the abutment.

11. In a clutch of the character described, the combination of a pair of relatively rotatable, complementary clutch members, arranged one within the other and shaped to form an annular recess therebetween, a clutch spring disposed in the recess between the two members and including a load carrying portion and an energizing portion connected to one end of the load carrying portion and normally having a slight frictional drag against one of the members, an abutment on the other member against which the other end of the load carrying portion of the spring is adapted to engage so that when said other member is rotated in one direction it will operate through the energizing portion of the spring to unwind the load carrying portion and cause the spring to change in diameter so as firmly to grip said one clutch member and cause the two members to be clutched together, and a lug on said other clutch member spaced from the abutment and engaging said one end of the load carrying portion of the spring so as to prevent axial displacement of the spring in one direction and hold said other end of the load carrying portion in engagement with the abutment.

WILLIAM C. STARKEY.